US012140039B2

(12) United States Patent
Richner et al.

(10) Patent No.: US 12,140,039 B2
(45) Date of Patent: Nov. 12, 2024

(54) LOW-WEAR TURBINE HOUSING CLAMPING CONNECTION

(71) Applicant: TURBO SYSTEMS SWITZERLAND LTD., Baden (CH)

(72) Inventors: Matthias Richner, Riniken (CH); Michael Gansner, Windisch (CH)

(73) Assignee: TURBO SYSTEMS SWITZERLAND LTD., Baden (CH)

( * ) Notice: Subject to any disclaimer, the term of this patent is extended or adjusted under 35 U.S.C. 154(b) by 0 days.

(21) Appl. No.: 18/577,076

(22) PCT Filed: Jul. 6, 2022

(86) PCT No.: PCT/EP2022/068775
§ 371 (c)(1),
(2) Date: Jan. 5, 2024

(87) PCT Pub. No.: WO2023/280935
PCT Pub. Date: Jan. 12, 2023

(65) Prior Publication Data

US 2024/0318580 A1 Sep. 26, 2024

(30) Foreign Application Priority Data

Jul. 6, 2021 (EP) .................................... 21184020

(51) Int. Cl.
*F01D 25/24* (2006.01)

(52) U.S. Cl.
CPC ........ *F01D 25/243* (2013.01); *F05D 2240/15* (2013.01); *F05D 2260/37* (2013.01)

(58) Field of Classification Search
CPC ... F01D 5/24; F01D 5/243; F01D 5/28; F05D 2240/15
See application file for complete search history.

(56) References Cited

U.S. PATENT DOCUMENTS 5,403,150 A * 4/1995 McEachern, Jr. ... F04D 29/5853 415/177
8,376,721 B2 * 2/2013 Thayer .................... F02B 39/00 417/366
(Continued)

FOREIGN PATENT DOCUMENTS

EP 2733311 A1 5/2014
WO 2020128222 A1 6/2020

OTHER PUBLICATIONS

English Translation of the International Search Report in Application No. PCT /EP2022/068775, mailed Oct. 4, 2022, 2 pages.

*Primary Examiner* — Woody A Lee, Jr.
*Assistant Examiner* — Cameron A Corday
(74) *Attorney, Agent, or Firm* — Meunier Carlin & Curfman LLC

(57) ABSTRACT

A turbine housing clamping connection for a turbine, and a turbine having a turbine housing clamping connection are described herein. The turbine housing clamping connection has a bearing housing, a turbine housing and a clamping component comprising a clamping flange clamped between a bearing housing clamping portion of the bearing housing and a turbine housing clamping portion of the turbine housing. The clamping flange has a bearing-housing-side clamping surface comprising a convexly curved clamping surface region. Furthermore, the convexly curved clamping surface region defines a minimum radius of curvature. A ratio of the minimum radius of curvature to an inner radius of the clamping surface is at least 0.1 and/or at most 10, and preferably at least 0.5 and/or at most 2.0, and more preferably at least 1.0 and/or at most 1.4.

17 Claims, 4 Drawing Sheets

(56) References Cited

U.S. PATENT DOCUMENTS

| | | | | |
|---|---|---|---|---|
| 2004/0109755 | A1* | 6/2004 | Meier | F01D 25/08 415/134 |
| 2015/0361812 | A1* | 12/2015 | Marino | F01D 25/243 415/214.1 |
| 2018/0087531 | A1* | 3/2018 | Weisbrod | F01D 25/243 |
| 2019/0112945 | A1* | 4/2019 | Kurle | F01D 9/026 |
| 2019/0301366 | A1* | 10/2019 | Weisbrod | G06T 7/277 |
| 2020/0173305 | A1 | 6/2020 | Tsukiyama et al. | |
| 2023/0003142 | A1* | 1/2023 | Vacca | F01D 25/24 |
| 2024/0125250 | A1* | 4/2024 | Geisweid | F01D 25/145 |

* cited by examiner

LOW-WEAR TURBINE HOUSING CLAMPING CONNECTION

TECHNICAL FIELD

The present disclosure relates to a turbine housing clamping connection for a turbine, and to a turbine comprising a turbine housing clamping connection.

BACKGROUND

Turbines, in particular radial-flow turbines, having a bearing housing, a turbine housing, a heat shield and a nozzle ring are known from the prior art. Typically in this case either the heat shield is clamped axially between the bearing housing and the nozzle ring and radially by the turbine housing, or the nozzle ring is clamped axially by the bearing housing and radially by the turbine housing. EP 1 428 983 A1 describes, for example, an exhaust gas turbine housing.

In applications with frequently changing load conditions, and in particular in the case of high load conditions, the turbine may exhibit signs of wear. This fatigue wear occurs in particular on the bearing housing and may in turn cause further problems.

In view of the above, there is a need for an improved nozzle ring for a turbine stage which can mitigate the above-mentioned problems and, in particular, can be easily adapted to the respective requirements of a turbocharger and/or an engine application.

SUMMARY OF THE INVENTION

This object is achieved at least in part by a turbine housing clamping connection for a turbine as claimed in claim 1. Furthermore, the object is achieved by a turbine comprising a turbine housing clamping connection as claimed in claim 14 and by the use of a turbine housing clamping connection as claimed in claim 15. Further embodiments, modifications and improvements are found in the following description and the appended claims.

According to one embodiment, a turbine housing clamping connection for a turbine, in particular a radial exhaust gas turbine, is provided. The turbine housing clamping connection has a bearing housing, a turbine housing and a clamping component comprising a clamping flange clamped between a bearing housing clamping portion of the bearing housing and a turbine housing clamping portion of the turbine housing. The clamping flange has a bearing-housing-side clamping surface comprising a convexly curved clamping surface region. Furthermore, the convexly curved clamping surface region defines a minimum radius of curvature. A ratio of the minimum radius of curvature to an inner radius of the clamping surface is at least 0.1 and/or at most 10, and preferably at least 0.5 and/or at most 2.0, and more preferably at least 1.0 and/or at most 1.4.

BRIEF DESCRIPTION OF THE FIGURES

The invention is explained in greater detail below with reference to embodiments which are not intended to restrict the scope of protection defined by the claims.

The accompanying drawings illustrate embodiments and, together with the description, serve to explain the principles of the invention. The elements of the drawings are shown relative to one other and are not necessarily true to scale. Similar reference signs denote correspondingly similar parts.

In the figures:

FIG. 1 shows a turbine housing clamping connection according to an embodiment, FIG. 2 shows a turbine housing clamping connection according to an embodiment, FIG. 3*a* shows a clamping component according to an embodiment, and FIG. 3*b* shows a clamping component according to an embodiment.

DETAILED DESCRIPTION

In the following detailed description, reference is made to the accompanying drawings, which form a part hereof and show, by way of illustration, specific embodiments in which the invention may be implemented. It is to be understood that other embodiments may be used, and structural or logical modifications may be made, without departing from the scope of protection of the present invention. The following detailed description is therefore not to be interpreted in a limiting manner, and the scope of protection of the present invention is determined by the appended claims. The embodiments described use specific language which is not to be interpreted as limiting the scope of protection of the appended claims.

Figure 1:
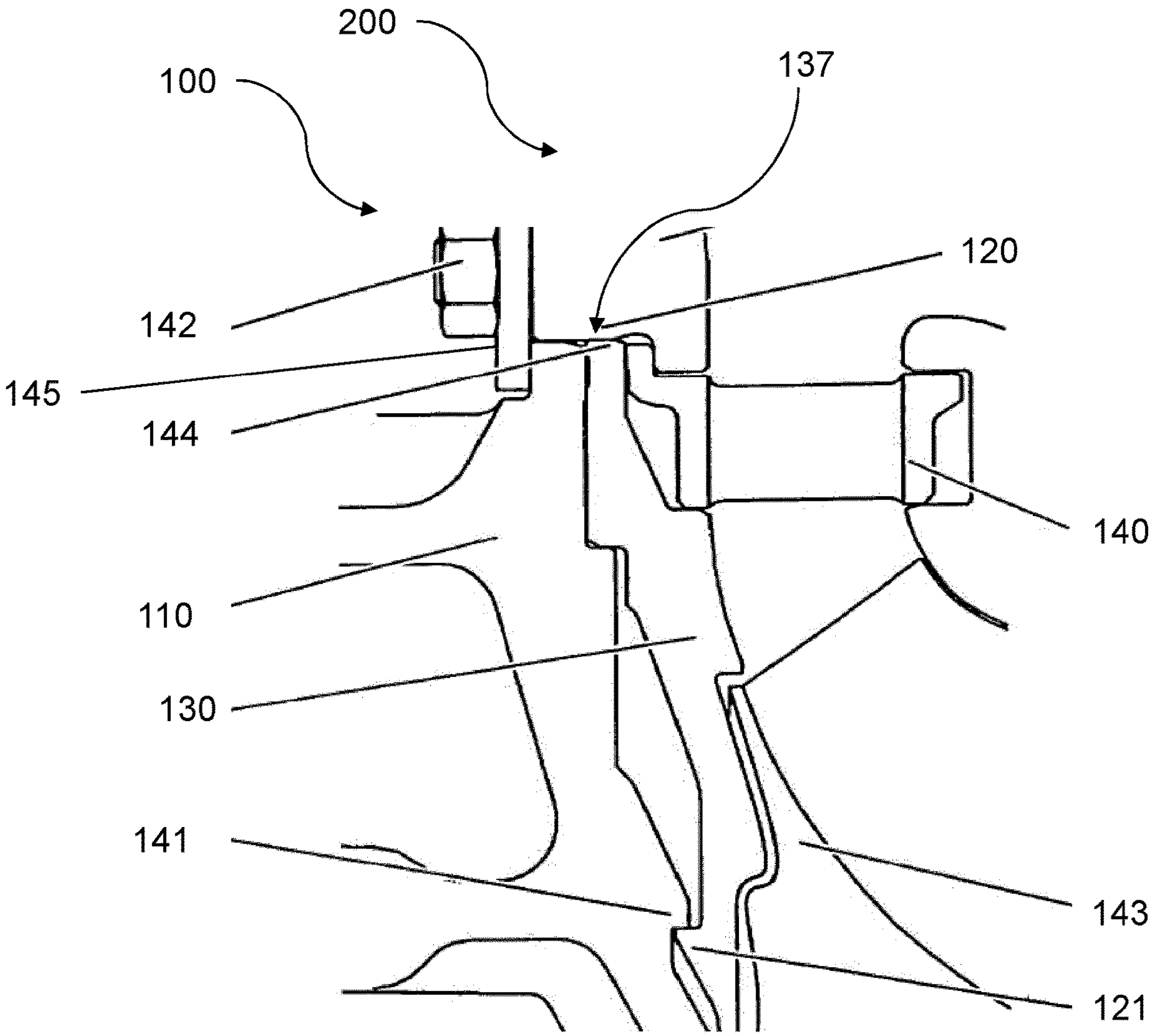
Figure 2:
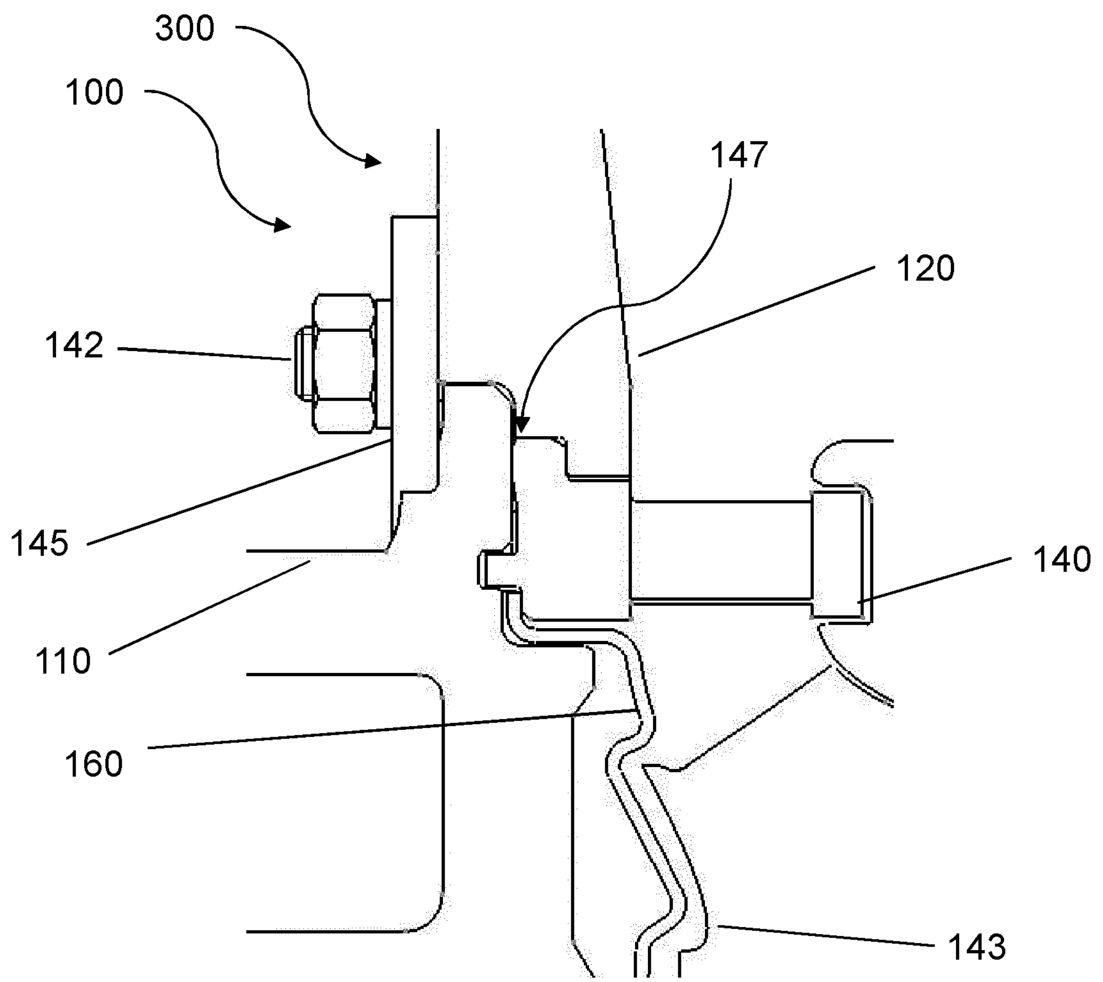
Figure 3A:
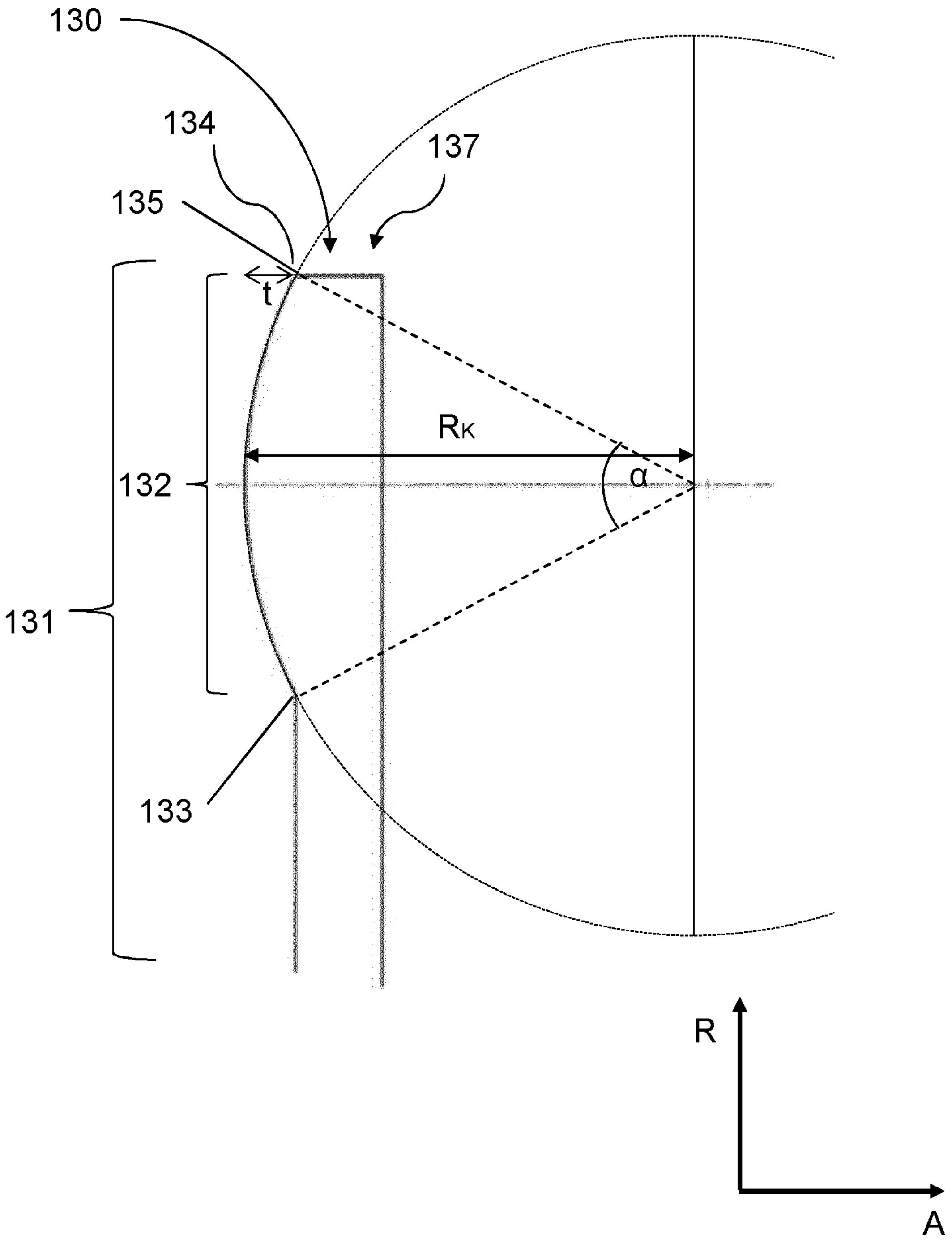
Figure 3B:
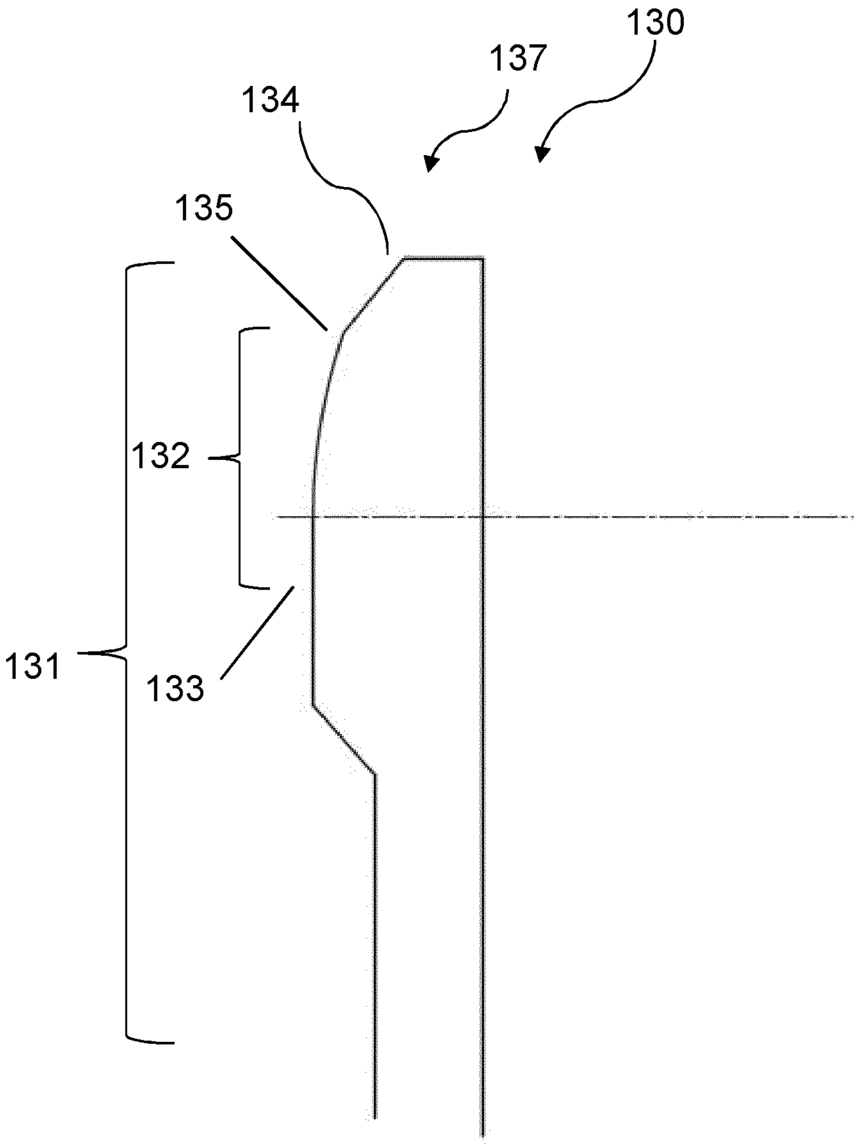

FIGS. 1 and 2 each show a turbine housing clamping connection according to an embodiment, wherein a bearing-housing-side clamping surface of a clamping flange is shown in a highly simplified manner. For illustrative purposes, the clamping connection is shown in an installed state in a turbine. Exemplary configurations of the bearing-housing-side clamping surface are depicted in FIGS. 3*a* and 3*b*.

As depicted in the embodiments in FIGS. 1 and 2, in accordance with a general aspect of the invention, a turbine housing clamping connection 100 for a turbine 200, 300, in particular a radial exhaust gas turbine, is provided. The turbine housing clamping connection 100 has a bearing housing 110 and a turbine housing 120. Furthermore, the turbine housing clamping connection 100 has (at least) one clamping component 130, 140 comprising a clamping flange 137, 147 clamped between a bearing housing clamping portion of the bearing housing 110 and a turbine housing clamping portion of the turbine housing 120. The clamping flange 137, 147 may in each case be clamped or secured directly (i.e., directly without further intermediate components) by the bearing housing 110 and the turbine housing 120 or indirectly (i.e., further components are arranged between the clamping flange and the bearing housing 110 or turbine housing 120).

According to an embodiment, the clamping component is a heat shield 130. FIG. 1 shows a clamping connection 100 comprising a heat shield 130 as a clamping component. The heat shield 130 is typically a substantially disk-shaped intermediate wall for shielding the bearing housing 110 from hot gases or exhaust gases flowing through an inflow channel of the turbine. Preferably, the turbine housing clamping connection 100 further has a nozzle ring 140, serving in this case as a further clamping component. The heat shield 130 may in this case be clamped axially, via the clamping flange 137 thereof, between the bearing housing clamping portion of the bearing housing 110 and the nozzle ring 140, and by the turbine housing clamping portion of the turbine housing 120. The heat shield 130 may further comprise one or more supports or edges 121, 144 for resting against a support or edge 141 of the bearing housing 110 and/or for support against the turbine housing 120. Furthermore, the clamping connection 100 may have one or more tabs 145 on the bearing housing 110, these tabs being fixable to the turbine housing with screws 142. By securely screwing the tabs 145, the heat shield 130 and the nozzle ring 140 are firmly secured between the turbine housing 120 and the bearing housing 110 and are fastened accordingly in the axial direction. In an idle mode of the turbine, when the turbine housing 120 and bearing housing 110 are cold, an inner surface, for example a circumferential, cylindrical inner surface, of the turbine housing 120 preferably rests on an outer surface, for example a circumferential, cylindrical outer surface, of the bearing housing 110 and is consequently centered appropriately relative to a turbine shaft of the turbine and the turbine wheel 143 arranged thereon.

According to a further embodiment, the clamping component 130, 140 is a nozzle ring 140. In FIG. 1, the nozzle ring 140 is also provided as a further clamping component of this type.

FIG. 2 depicts a further example of a clamping connection 100, in which the clamping component is a nozzle ring 140. The turbine housing clamping connection 100 may further have a heat shield 160. The heat shield 160 may be arranged radially further inward than the nozzle ring 140, and may be held in place axially by a second bearing housing clamping portion. Furthermore, the heat shield 160 may be held in place axially and radially by the nozzle ring 140, for example by means of a support of the nozzle ring 140. The heat shield 160 may typically take the form of a substantially disk-shaped intermediate wall for shielding the bearing housing from hot gases or exhaust gases flowing through an inflow channel of the turbine. The heat shield 160 may further comprise one or more supports for resting against the bearing housing 110 and/or the nozzle ring 140.

The clamping flange 137, 147 of the clamping component, for instance at least one of the clamping components 130, 140 shown in FIGS. 1 and 2, has a bearing-housing-side clamping surface 131 comprising a convexly curved clamping surface region 132. FIGS. 3*a* and 3*b* illustrate configurations of the bearing-housing-side clamping surface 131 using, as an example, the clamping flange 137 of a heat shield 130. In the event that the clamping component is not a heat shield and is for example a nozzle ring 140, the bearing-housing-side clamping surface may be configured accordingly and the description of the clamping flange 137 can be applied analogously to the clamping flange 147.

According to a general aspect, the clamping component 130, 140 (and also the bearing housing and the turbine housing) is constructed so as to completely surround a turbine shaft. The clamping component 130, 140 may have a substantially disk-shaped cross section. In this case, the clamping flange is preferably clamped over the entire circumference of the clamping component 130, 140 between the bearing housing clamping portion of the bearing housing 110 and the turbine housing clamping portion of the turbine housing 120.

The convexly curved clamping surface region 132 of the bearing-housing-side clamping surface is preferably arranged in a radially outer manner on the clamping flange 137. FIGS. 3*a* and 3*b* each show examples of the bearing-housing-side clamping surface 131 with a convexly curved clamping surface region 132 arranged in a radially outer manner. In this case, the convexly curved clamping surface region 132 has a convexly curved portion which, as viewed in a radially outward manner from a radially inner position, is oriented away from the bearing housing 110. The axial direction is in this case defined by the turbine shaft, while the radial direction extends perpendicularly to the axial direction. In FIG. 3*a*, the radial direction R (radially outward from a radially inner position) and the axial direction A are each denoted by an arrow. In other words, the radially outer clamping surface region 132 is convexly curved in a cross-sectional view containing a turbine shaft.

In this case, the convexly curved clamping surface region 132 defines a minimum radius $R_K$ of curvature. The radius $R_K$ of curvature is denoted by a double-headed arrow in FIG. 3*a*. The convexly curved clamping surface region 132 further defines an osculating circle segment $U_K$. The osculating circle segment is in this case slightly or gently convexly curved or rounded.

In this case, a radially inner end 133 of the convexly curved clamping surface region 132 may correspond, on the bearing housing side, to an axially outermost point of the convexly curved clamping surface region 132, as shown for example in FIG. 3*b*. In this case, the radially inner end 133 has a minimal distance (when viewed in the idle state) to the bearing housing clamping portion, and/or is secured directly to the bearing housing clamping portion. Alternatively, a point on the convexly curved clamping surface region 132 which is at a distance from the radially inner end 133 may correspond, on the bearing housing side, to an axially outermost point, as shown for example in FIG. 3*a*.

In other words, an axially outermost point (as viewed from the bearing housing side) of the osculating circle segment $U_K$ may correspond to a radially inner end 133, wherein the clamping surface region extends away from the bearing housing 110, as viewed from the radially inner end 133 to a radially outer end 135. Alternatively, an axially outermost point of the osculating circle segment $U_K$ may also be arranged at any desired location along the osculating circle segment $U_K$.

The bearing-housing-side clamping surface 131 may have one or more clamping surface regions which are clamped by the bearing housing clamping portion. Typically, the bearing-housing-side clamping surface defines at least one further clamping surface region. The further clamping surface region is preferably a radially inner clamping surface region, and/or a radially outermost clamping surface region. For example, FIG. 3*b* shows a bearing-housing-side clamping surface 131 comprising the convexly curved clamping surface region 132, a radially inner clamping surface region and a radially outermost clamping surface region.

The radially inner clamping surface region and/or the radially outermost clamping surface region are preferably not convexly curved, but are formed so as to be substantially flat. For example, the radially inner clamping surface region and/or the radially outermost clamping surface region may, however, also have a convexly shaped portion with a radius of curvature which is smaller than the minimum radius of curvature of the convexly curved clamping surface region 132.

In alternative configurations, the bearing-housing-side clamping surface does not have a radially outermost clamping surface region. In this case, the convexly curved (radially outer) clamping surface region extends to the radial end 134 of the bearing-housing-side clamping surface. FIG. 3*a* depicts a bearing-housing-side clamping surface 131 in which the radially outer end 135 of the convexly curved clamping surface region 132 corresponds to the radial end 134 of the bearing-housing-side clamping surface.

The convexly curved clamping surface region is preferably a radially outer clamping surface region of the bearing-housing-side clamping surface. The bearing-housing-side clamping surface may further comprise the radially inner clamping surface region. The convexly curved (radially outer) clamping surface region 132 adjoins the radially inner clamping surface region in a continuous manner, preferably a tangentially continuous manner. For example, FIG. 3*b* shows a tangentially continuous transition from the radially inner end 133 to the flat, radially inner clamping surface region. In a cross-sectional view containing a turbine shaft, the radially inner clamping surface region preferably extends in a straight line in the radial direction. This makes it possible to provide a smooth, continuous transition between the convexly curved clamping surface region and the radially inner clamping surface region. This can also serve to counter high local bearing stress, in both the stationary and transient operating states. The radially inner clamping surface region may be formed so as to be substantially flat (as viewed in the radial direction).

Additionally or alternatively, the bearing-housing-side clamping surface may comprise the radially outermost clamping surface region. The radially outermost clamping surface region may adjoin the convexly curved (radially outer) clamping surface region in a continuous manner, preferably a tangentially continuous manner. This preferably results in a smooth, continuous transition between the convexly curved (radially outer) clamping surface region and the radially outermost clamping surface region. The radially outermost clamping surface region may be formed so as to be substantially flat (as viewed in the axial direction), and may deviate slightly or gently from a flat course in the region of a transition to the convexly curved clamping surface region.

An inner radius $D_R$ of the clamping surface is in this case the radius measured from the centroid of the turbine shaft or the centroid of a cross-sectional view of the clamping component. According to the present disclosure, the inner radius $D_R$ is the radius measured in the idle state of the turbine housing clamping connection or turbine. For example, under high load conditions, heating may cause a slight expansion and thus a change in the inner radius $D_R$. All characteristics or parameters disclosed herein are values measured in the idle state unless expressly described otherwise.

The inner radius $D_R$ is the radius of the convexly curved clamping surface region, preferably the radius at the axially outermost point, as viewed from the bearing housing side, of the curved clamping surface region. In some configurations, the inner radius $D_R$ is the radius of the radially inner end 133. In other words, the inner radius $D_R$ is preferably the radial distance between the centroid of the turbine shaft and the axially outermost point, as viewed from the bearing housing side, of the curved clamping surface region.

The inventors have identified that in turbine housing clamping connections known from the prior art, asymmetric heating between the bearing housing 110 and the clamping component 130, 140, for example a heat shield, may cause the contact surface between the bearing housing and the clamping component to tilt or tip. For example, the bearing housing may consist of the alloy GGG40, and the clamping component may consist of a higher-alloy, generally heat-resistant, material. The clamping component is typically arranged in a fluid channel and thus becomes hotter than the contact point between the bearing housing and the clamping component. The clamping component heats up more rapidly during operation and typically has a greater coefficient of thermal expansion than the bearing housing. This asymmetric heat input causes the clamping component to move relative to the bearing housing during the heating process and under changing load conditions.

The tipping of the contact surface between the bearing housing and the clamping component in turbine housing clamping connections known from the prior art gives rise to high local bearing stress. As a result of the relative movement, this highly loaded point migrates across the contact surface of the bearing housing 110 (of the bearing housing clamping portion) and causes fatigue wear, which may in turn lead to further problems, such as loss of bolt preload or gas leakage.

The turbine housing clamping connection according to embodiments of the present disclosure has a clamping component 130 comprising the convexly curved clamping surface region 132, which considerably reduces wear on the components, and in particular on the bearing housing. Providing the clamping surface region with a slightly or gently convexly curved shape makes it is possible to ensure the clamping surface is supported over a wide area and high local bearing stress is thus prevented, not only in a "hot" state (i.e., under high load conditions or at high temperatures of a fluid in the radial-flow turbine), but also in the states throughout the heating process, as well as in an idle state. Due to the slightly convexly curved shape, an extended contact surface is provided in both the stationary and transient operating states between the bearing housing clamping portion and the bearing-housing-side clamping surface, resulting in a substantial reduction in wear. The convexly curved clamping surface region configured according to the invention makes it possible for the clamping component to tilt slightly during the heating process without resulting in excessive local contact stress, compared to a cold state, in a contact region between the bearing housing clamping portion and the bearing-housing-side clamping surface.

The inventors have further identified that high local bearing stress and the fatigue wear connected therewith can be countered most effectively when the ratio of the minimum radius of curvature to an inner radius of the clamping surface is at least 0.1 and/or at most 10, preferably at least 0.5 and/or at most 2.0, and more preferably at least 1.0 and/or at most 1.4.

According to embodiments of the present disclosure, the curved clamping surface region is constructed to guarantee substantially surface-to-surface contact with the bearing housing clamping portion when the clamping flange tilts. In this case, "tilting" means that a radially inner part of the clamping flange is moved axially away from the bearing housing relative to a radially outer part of the clamping flange and/or is moved (tilts) in the direction of the turbine housing. Tilting may involve a rolling and/or shifting movement of the clamping surface. This means that tilting may also take place without a fixed tilting point on the clamping surface. In this case, "surface-to-surface contact" is not necessarily to be understood as contact over the entire surface between the bearing housing clamping portion and the convexly curved clamping surface region. By constructing the curved clamping surface region to ensure surface-to-surface contact with the bearing housing clamping portion, high local bearing pressure is still prevented. The convexly curved clamping surface region is thus constructed to counter wear on the bearing housing.

According to an aspect, an axial offset t between an axially outermost point of the curved clamping surface region 132 on the bearing housing side and the radially outer end 135 of the curved clamping surface region 132 is at least 0.01 mm and/or at most 0.5 mm, preferably 0.02 mm and/or at most 0.2 mm, and more preferably at least 0.03 mm and/or at most 0.1 mm. In FIG. 3*a*, the axial offset t is depicted by a double-headed arrow. The axial offset may in this case refer to the maximum radius $R_K$ of curvature achievable during operation, and in particular in the idle state. Under higher load conditions, the clamping flange may tilt, causing the axial offset t to decrease.

Additionally or alternatively, an axial offset t between the radially inner end 133 of the curved clamping surface region 132 and the radially outer end 135 of the curved clamping surface region 132 is at least 0.01 mm and/or at most 0.5 mm, preferably 0.02 mm and/or at most 0.2 mm, and more preferably at least 0.03 mm and/or at most 0.1 mm. The radially outer end 135 is axially offset toward the turbine housing due to the convex curvature. The radially inner end 133 is in some configurations axially offset toward the bearing housing (as shown for example in FIG. 3*b*) due to the convex curvature, and in other configurations is also axially offset toward the turbine housing (as shown for example in FIG. 3*a*) due to the convex curvature. The radially outer end 135 may be the radially outermost point achievable during operation with which the bearing housing clamping portion of the bearing housing 110 can be clamped.

In an aspect, the minimum radius $R_K$ of curvature of the convexly curved clamping surface region 132 is at least 20 mm and/or at most 1000 mm, and preferably at least 50 mm and/or at most 500 mm, more preferably 100 mm and/or at most 200 mm, and most preferably at least 140 mm and/or at most 160 mm. In an exemplary configuration, the minimum radius $R_K$ of curvature is 150 mm. A radius $R_K$ of curvature in the aforementioned range guarantees that the curvature deviates sufficiently from a flat clamping surface region and at the same time is not excessively curved. Additionally or alternatively, the inner radius $D_R$ of the clamping surface or the convexly curved clamping surface region 132 may be at least 20 mm and/or at most 300 mm, preferably at least 100 and/or at most 140 mm.

The curved clamping surface region 132 may have a radial extent of at least 0.5 mm and/or at most 10 mm. Preferably, the curved clamping surface region 132 has a radial extent of at least 3 mm and/or at most 6 mm. In embodiments in which the clamping surface comprises the radially outermost clamping surface region, a radial distance between the radially inner end 133 of the curved clamping surface region 132 and the radial end 134 of the bearing-housing-side clamping surface may be at least 2 mm and/or at most 20 mm, preferably at least 6 mm and/or at most 10 mm.

A ratio of the radial extent of the curved clamping surface region 132 to the inner radius $D_R$ of the clamping surface or of the convexly curved clamping surface region 132 may be at least 0.005 and/or at most 0.1, preferably at least 0.02 and/or at most 0.05.

In a preferred embodiment, a ratio of the axial offset t to the radial extent of the curved clamping surface region 132 is at least $5*10^{-3}$ and/or at most 0.02, and preferably at least $8*10^{-3}$ and/or at most 0.015. A ratio in the aforementioned range guarantees that the curvature deviates sufficiently from a flat clamping surface region and at the same time is not excessively curved.

The curved clamping surface region 132, and in particular the radially inner end 133 and the radially outer end 135 of the convexly curved clamping surface region 132, define(s) the osculating circle segment $U_K$. A central angle alpha α of the osculating circle segment $U_K$ may be at least 0.5° and/or at most 4°, preferably at least 1.2° and/or at most 2.0°. FIG. 3*a* depicts the central angle alpha α.

Additionally or alternatively, a ratio of the axial offset t and the radius $R_K$ of curvature may be at least $2*10^{-4}$ and/or at most $2*10^{-3}$, and preferably at least $3*10^{-4}$ and/or at most $8*10^{-4}$.

A tangential angle of the curved clamping surface region 132 relative to the radial direction may be at least 0.5° and/or at most 4°, preferably at least 1.2° and/or at most 2.0°. Furthermore, in a cross-sectional view containing the turbine shaft, at least one tangential angle of the curved clamping surface region 132 relative to the radial direction may be at least 0.5°, preferably at least 1.2°, and/or all tangential angles of the curved clamping surface region 132 relative to the radial direction may be at most 4°, preferably at most 2.0°.

The other sides of the clamping flange, for example a turbine-housing-side clamping surface, are not specifically limited according to the present disclosure, and may be formed in accordance with clamping flanges known in the prior art.

According to an aspect, a turbine, preferably a radial-flow turbine 200, 300, is provided. The turbine has the turbine housing clamping connection according to any one of the embodiments described herein. In a configuration, the turbine is a power turbine and/or an exhaust gas turbine. For example, the exhaust gas turbine may be an exhaust turbocharger turbine. According to an embodiment, a turbocharger is provided which comprises the turbine according to any one of the embodiments described herein. The turbine may further have a turbine wheel 143.

An aspect relates to the use of a turbine housing clamping connection for a radial-flow turbine for countering wear on a bearing housing of the radial-flow turbine. The turbine housing clamping connection and/or the radial-flow turbine may be configured according to any of the embodiments disclosed herein. The turbine housing clamping connection has a convexly curved clamping surface region, in particular according to any one of the embodiments disclosed above.

Although specific embodiments have been illustrated and described herein, the embodiments shown may be combined or modified in a suitable manner within the scope of the present invention, without departing from the scope of protection of the present invention.

LIST OF REFERENCE SIGNS

100 turbine housing clamping connection
110 bearing housing
120 turbine housing
121 support, edge
130, 160 heat shield
131 bearing-housing-side clamping surface
132 convexly curved clamping surface region
133 radially inner end of the convexly curved clamping surface region
134 radial end of the bearing-housing-side clamping surface
135 radially outer end of the convexly curved clamping surface region
140 nozzle ring
141 support, edge
142 fastening, screw
143 turbine wheel
144 support
145 tab
150 turbine shaft
200, 300 radial-flow turbine

The invention claimed is:

1. A turbine housing clamping connection for a turbine having:

a bearing housing and a turbine housing; and a clamping component comprising a clamping flange clamped between a bearing housing clamping portion of the bearing housing and a turbine housing clamping portion of the turbine housing;

wherein the clamping flange has a bearing-housing-side clamping surface comprising a convexly curved clamping surface region, wherein the convexly curved clamping surface region defines a minimum radius ($R_K$) of curvature, and wherein a ratio of the minimum radius ($R_K$) of curvature to an inner radius ($D_R$) of the clamping surface is at least 0.1 and/or at most 10, wherein the inner radius ($D_R$) is the radius at the axially outermost point, as viewed from the bearing housing side, of the convexly curved clamping surface region.

2. The turbine housing clamping connection as claimed in claim 1, wherein the convexly curved clamping surface region is a radially outer clamping surface region of the bearing housing-side clamping surface, wherein the bearing-housing-side clamping surface further has a radially inner clamping surface region, and wherein the radially outer clamping surface region adjoins the radially inner clamping surface region in a continuous manner.

3. The turbine housing clamping connection of claim 1, wherein the curved clamping surface region is constructed to guarantee substantially surface-to-surface contact with the bearing housing clamping portion when the clamping flange tilts.

4. The turbine housing clamping connection of claim 1, wherein an axial offset (t) between the radially inner end of the curved clamping surface region and a radially outer end of the curved clamping surface region is at least 0.02 mm and/or at most 0.2 mm.

5. The turbine housing clamping connection of claim 1, wherein the radius ($R_K$) of curvature is at least 20 mm and/or at most 1000 mm.

6. The turbine housing clamping connection of claim 1, wherein the inner radius ($D_R$) of the clamping surface is at least 20 mm and/or at most 300 mm.

7. The turbine housing clamping connection of claim 1, wherein the curved clamping surface region defines an osculating circle segment ($U_K$), and wherein a central angle alpha ($\alpha$) of the osculating circle segment ($U_K$) is at least 0.5° and/or at most 4.

8. The turbine housing clamping connection of claim 1, wherein in a cross-sectional view containing the turbine shaft, at least one tangential angle of the curved clamping surface region relative to the radial direction is at least 0.5° and/or all tangential angles of the curved clamping surface region relative to the radial direction are at most 4°.

9. The turbine housing clamping connection of claim 1, wherein the curved clamping surface region has a radial extent of at least 0.5 mm and/or at most 10 mm.

10. The turbine housing clamping connection of claim 4, wherein a ratio of the axial offset (t) to the radial extent of the curved clamping surface region is at least $5*10^{-3}$ and/or at most 0.02.

11. The turbine housing clamping connection of claim 1, wherein the clamping component is a heat shield.

12. The turbine housing clamping connection as claimed in claim 11, further having a nozzle ring, wherein the heat shield is clamped axially between the bearing housing clamping portion of the bearing housing and the nozzle ring.

13. The turbine housing clamping connection of claim 1, wherein the clamping component is a nozzle ring.

14. A turbine having the turbine housing clamping connection of claim 1.

15. The turbine housing clamping connection as claimed in claim 1, wherein the turbine comprises a radial-flow turbine, and wherein the convexly curved clamping surface region reduces wear on the bearing housing of the radial-flow turbine.

16. The turbine housing clamping connection of claim 1, wherein a ratio of the radial extent of the curved clamping surface region to the inner radius ($D_R$) of the clamping surface is at least 0.005 and/or at most 0.1.

17. A radial flow turbine having the turbine housing clamping connection of claim 1.

* * * * *